United States Patent [19]
Powers

[11] Patent Number: 5,716,078
[45] Date of Patent: Feb. 10, 1998

[54] THERMOPLASTIC PIPE JOINT

[76] Inventor: Ronald L. Powers, 3300 23rd St., Great Bend, Kans. 67530

[21] Appl. No.: 848,695

[22] Filed: Apr. 29, 1997

Related U.S. Application Data

[63] Continuation-in-part of Ser. No. 692,069, Aug. 7, 1996, abandoned.

[51] Int. Cl.⁶ .................... F16L 17/02; F16L 15/06
[52] U.S. Cl. .................. 285/110; 285/423; 285/355; 285/332.3
[58] Field of Search ..................... 285/110, 423, 285/355, 390, 332.2, 332.3, 333, 903, 374, 337, 334.1

[56] References Cited

U.S. PATENT DOCUMENTS

| | | | |
|---|---|---|---|
| 2,107,716 | 2/1938 | Singleton | 285/332.3 |
| 2,755,110 | 7/1956 | Jacobs | 285/423 |
| 2,760,673 | 8/1956 | Laurent | 285/334.1 |
| 3,163,432 | 12/1964 | Boer | 285/110 |
| 3,331,621 | 7/1967 | Bagnulo | 285/374 |
| 3,466,383 | 9/1969 | Decker | 285/374 |
| 3,701,548 | 10/1972 | McGuire | 285/81 |
| 3,813,115 | 5/1974 | French | 285/355 |
| 3,887,992 | 6/1975 | Parmann | 29/450 |
| 4,014,568 | 3/1977 | Carter et al. | 285/110 |
| 4,050,721 | 9/1977 | Streit | 285/93 |
| 4,154,466 | 5/1979 | Simmons | 285/334 |
| 4,303,262 | 12/1981 | Pierrel et al. | 285/374 |
| 4,468,367 | 8/1984 | Beune et al. | 285/110 |
| 4,537,426 | 8/1985 | Carter, Sr. | 285/110 |
| 4,789,167 | 12/1988 | Housas | 285/110 |

FOREIGN PATENT DOCUMENTS

WO9012976  11/1990  WIPO .................. 285/355

*Primary Examiner*—Eric K. Nicholson
*Attorney, Agent, or Firm*—Herzog, Crebs & McGhee, LLP

[57] ABSTRACT

A piping structure and method of manufacture allow for the mechanical joining of two piping products as well as the hydraulic and mechanical sealing thereof by means of an elastomeric gasket having an integral pressure transference device. A socket is produced in one pipe product along with an integrally formed interlock means and the gasket. A spigot is produced in another pipe product along with an integrally formed interlock means complementary to the socket interlock means. The gasket is situated within the socket adjacent a tapered wall portion of the socket and is compressed by a tapered portion of the spigot. In a preferred form, the piping product is formed of a thermoplastic wherein the socket and spigot are easily formed after initial production of the piping product. However, the present joining system is not limited to after product formation and may be utilized for a variety of piping materials and methods of manufacture.

18 Claims, 4 Drawing Sheets

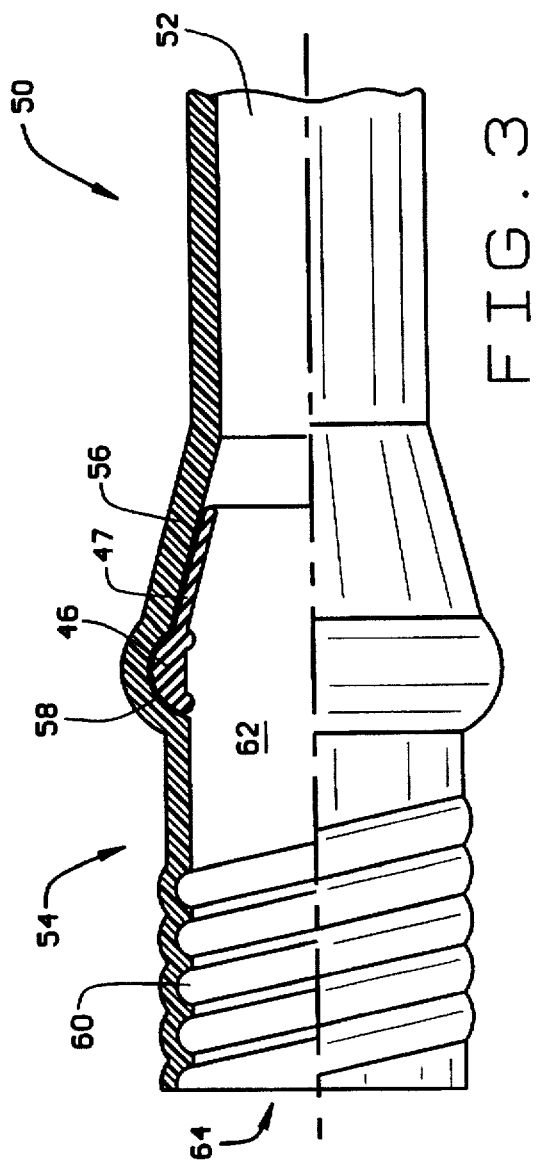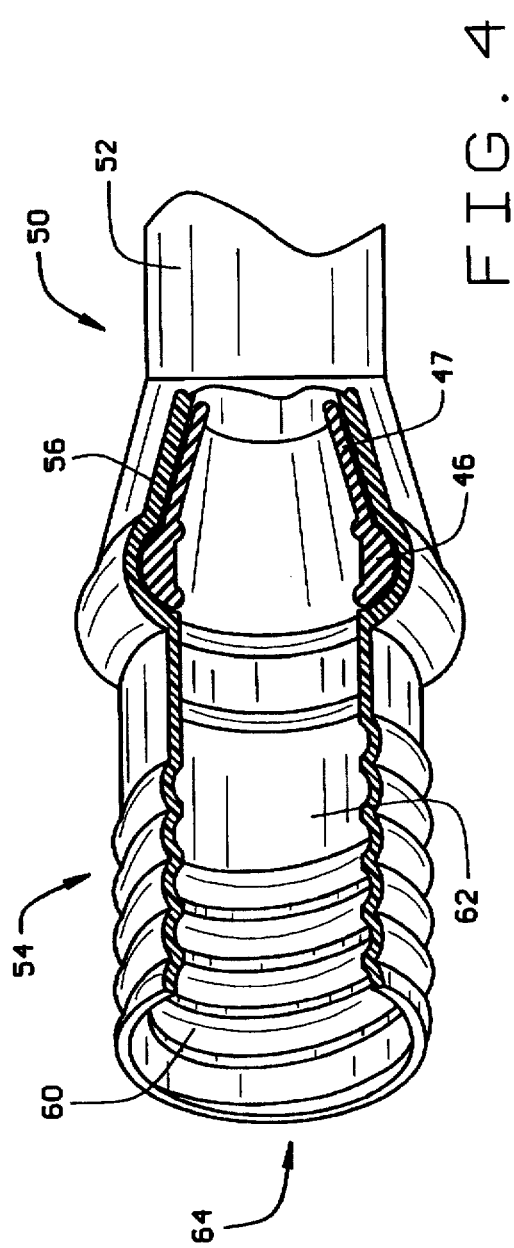

THERMOPLASTIC PIPE JOINT

RELATED APPLICATION

This is a continuation-in-part application of Ser. No. 08/692,069, filed Aug. 7, 1996 now abandoned.

FIELD OF THE INVENTION

The present invention relates to pipe joining systems and their method of manufacture and, in the preferred embodiment, to systems to join thermally deformable plastic piping and the method of making the same.

BACKGROUND OF THE INVENTION

There now exists numerous markets that utilize piping to convey fluids from one point to another. A nonexclusive sample listing of these markets include turf irrigation, both residential and commercial, plumbing, both residential and commercial, rural and municipal water and sewer districts, agricultural irrigation, the oil and gas industry, industrial mining and disposal, hot and cold air ducting, and industrial piping. In the distant past these markets utilized metal pipes such as iron or steel. However, with the advent of plastic, pipes formed of plastic have almost replaced those of metal. This is due to the lightweight nature of plastic and the fact that plastic does not oxidize like iron or steel piping. Furthermore, present plastics can handle most pressure requirements.

While there are many types of plastic, thermally deformable plastic or thermoplastic pipe, for example polyvinyl chloride (PVC) pipe is widely used in many applications. PVC pipe is lightweight, inexpensive to manufacture, and may be sized to withstand various working pressures.

Current pipe joining systems utilize an elastomeric sealing ring or gasket disposed within a socket of a first section of pipe into which is shoved the spigot end of a second section of pipe. The elastomeric gasket provides only hydraulic sealing of the pipe joint. It is currently estimated that the domestic PVC pipe business alone is 4.5 billion pounds per year. At an average cost of $0.45 per pound, this is a $2.025 billion a year market. Approximately twenty percent (20%) of this market is presently gasketed piping utilizing elastomeric seals. The balance of the market (≈80%) is assembled using solvent cements. Additionally, it is currently estimated that the fitting market is a $500,000,000 per year market, with approximately twenty percent (20%) being gasketed fittings. Again, the remainder (≈80%) of the market is assembled using solvent cements.

It is thus evident that the use of solvent cements to chemically weld plastic piping is the most used method. However, most solvents are harmful to the environment due to their VOC content or the like. Also, once assembled, the chemically welded joints may not be disassembled. Thus, while these type of joints are generally leak proof, the use of solvents in assembly is still objectionable regarding maintaining a clean environment.

With current gasketed pipes, the joints may or may not be additionally chemically welded. Those that are not additionally chemically welded do not provide great security against leakage. In most cases leakage of the fluid within the piping is not desired as the fluid may also harm the environment.

Because of this, current pipe joints used in underground applications require thrust blocking to maintain the seal against hydraulic pressure. Above ground applications require chemical bonding known as solvent welding. Even so, hydraulic pressure can cause seepage from the joints which is considered "tolerable" in today's standards.

However, due to the increasing concern for the environment, due to both seepage and the use of chemicals for solvent welding, there is a need for a pipe joint that provides a mechanical interlock as well as provide the required hydraulic sealing.

As an example of the prior art, U.S. Pat. No. 3,701,548 issued to McGuire discloses a mechanical joining system for pipes wherein lugs are added to the exterior surface of a spigot while L-shaped receiving grooves are formed in a socket. A ¼ rotation joins the spigot to the socket. It is recommended that the joint be solvent welded in order to make the joint permanent. For high pressure applications, a gasket is added proximate the lugs/grooves. The manufacture of this joint requires adding material to an unworked pipe end, which is more costly and harder to produce. Also, the joining system is designed to be utilized with solvent welding or compression.

As another example of the prior art, U.S. Pat. No. 3,887,992 issued to Parmann, discloses a method of producing pipe joints for thermoplastic piping. The process requires the use of a separate, permanently shaped dimensionally stable socket mould member that functions as a reinforcing body. The reinforcing body forms a socket in a first pipe section by insertion of the reinforcing body into the first pipe section after heating thereof, but remains therein for receipt of a non-formed, non-tapered second pipe section. A gasket is disposed in the reinforcing body remote from any formed taper, that forms a hydraulic seal between the reinforcing body and the second pipe section. The resulting pipe joint does not alleviate the need for compression of the joint.

As a further example of the prior art, U.S. Pat. No. 4,537,426 issued to Carter, teaches a two part pipe coupling for receiving and allowing fluid communication between two generic pipe ends. The pipe coupling consists of a male coupling element and a female coupling element. One pipe section is chemically bonded to the male coupling with the other pipe section is chemically bonded to the female coupling. The male coupling has external threads thereon that threadedly mate with internal threads within the female coupling. Both the male and female couplings are made by filament winding. Additionally, a gasket is provided between the male and female couplings. The pipe coupling does allow for the disassembly of the pipe sections, however, the pipe coupling is a separately manufactured structure and the pipe sections must be chemically bonded (e.g. solvent welded) to the respective pipe coupling.

In yet another example of the prior art, U.S. Pat. No. 5,050,721 issued to Streit, discloses reinforced plastic piping. The plastic piping is made of a structurally rigid plastic such as polyethylene and includes thread rib segments on an end of one pipe section that are received on thread groove segments on the other pipe section.

In still another example of the prior art, U.S. Pat. No. 4,154,466 Simmons discloses a pipe coupling wherein threads and a gasket are provided. The gasket is remote from the end of the pipe section. The pipe is formed of a resin impregnated fiber material.

In view of the above, it is an object of the present invention to provide a pipe joining system that eliminates the need for restraining, such as in hydraulic sealing, elastomeric only joints.

It is another object of the present invention to provide a pipe joining system for formable pipe and pipe fittings that is integrally formed in the thermoplastic material.

It is further an object of the present invention to provide a pipe joint system that provides mechanical interlocking of the socket and the spigot ends of sections of pipe as well as mechanical and hydraulic sealing of an elastomeric seal.

It is still further an object of the present invention to provide a pipe joining system that may also be easily disassembled.

It is yet further an object of the present invention to provide a reusable joining system for pipes.

It is still yet further an object of the present invention to provide a gasket for a pipe joining system that has a pressure transference device to effect mechanical sealing of the gasket between the socket and spigot.

SUMMARY OF THE INVENTION

According to one aspect, the present invention is a piping product joining structure that combines a mechanical interlock with an elastomeric, pressure transference gasket. The joining structure both restrains and seals the piping products.

In one form the mechanical interlock is formed integral with a socket or bell at one end of a first section of piping product while a complementary mechanical interlock is formed integral with a spigot at one end of a second section of piping product. The gasket is also formed therein at the same time as the formation of the socket.

The interlock may be threads that allow the mechanical joining of the spigot into the socket. The socket and spigot would also include tapers proximate to which the gasket is disposed. During assembly of the spigot into the socket the gasket is compressed at the point of taper intersection.

According to another aspect of the present invention, the gasket is formed with a pressure transference device that, when compressed as described above, provides a mechanic as well as a hydraulic seal.

By the use of the particular gasket, the annular area of the joint is sealed against fluid intrusion. As such, hydraulic pressure does not build about annular area and thus does not hydraulically release the seal upon sustained high pressure.

In the formation of the socket and spigot in formable plastic piping products such as thermoplastic PVC piping, the socket and spigot are vacuum formed on mandrels after the piping product is formed. Ends of the preformed piping product are heated and placed about the respective mandrel. A vacuum is pulled to conform the piping product to the shape of the mandrel. The mandrel is counter-rotated to remove the same after the piping product has cooled.

The finished piping product should have a consistent wall thickness throughout its length, within published industry standard tolerances. In order to produce a socket of a uniform thickness consistent with the rest of the pipe, it may be necessary to form the initial pipe product with additional thickness at the formation end. This may be accomplished by known methods.

Of course, other methods of production are applicable on various piping products depending on the piping material to produce the same type of formation.

Because the need for solvent welding or thrust blocking is eliminated by the present design, every pipe joint assembles with the same physical compression. The amount of physical compression of the pipe joint is not dependent upon the force applied by the thrust block.

Additionally, the present method is applicable to pipe fittings and all types of piping products such as steel, aluminum, copper, cement asbestos, fiberglass, fine ceramic and virtually all other types.

BRIEF DESCRIPTION OF THE DRAWINGS

So that the manner in which the above-recited features, advantages, and objects of the present invention are attained and can be understood in detail, a more particular description of the invention, briefly summarized above, may be had by reference to the embodiments thereof which are illustrated in the appended drawings.

It is noted, however, that the appended drawings illustrate only typical embodiments of this invention and are therefore not to be considered limiting of the scope, for the invention may admit to other equally effective embodiments. Reference the appended drawings, wherein:

FIG. 3 is a partial cutaway view of a finished socket produced on the belling mandrel of FIG. 2;

FIG. 4 is a partial cutaway view of the finished socket of FIG. 3;

DETAILED DESCRIPTION

Figure 1:
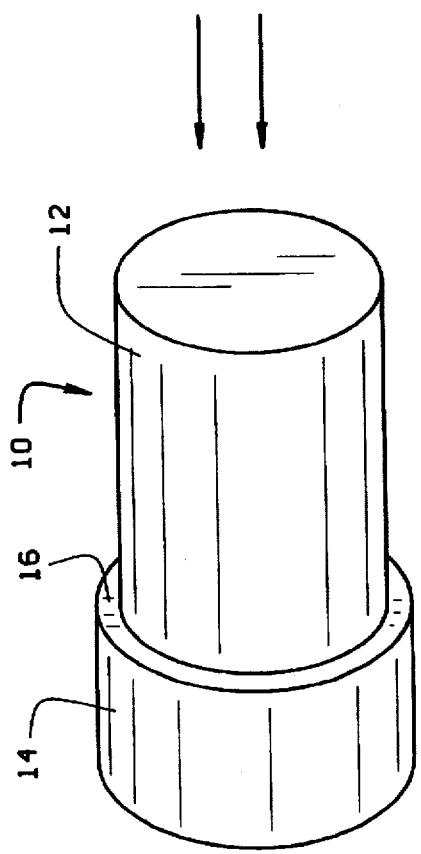
FIG. 1 is an isometric view of a prior art belling mandrel.

Referring now to FIG. 1 there is depicted a prior art mandrel generally designated 10 that may be used to produce a socket or bell at an end of a section of deformable pipe, such as thermoplastic (e.g. PVC) pipe. The prior art belling mandrel 10 includes a first diameter cylindrical portion 12 integral with a second diameter cylindrical portion 14. Defined between the first and second diameter cylindrical portions 12 and 14 is a shoulder 16. The first diameter cylindrical portion 12 is sized to be larger in diameter than the pipe section. In the prior art, during the belling process, an end of a section of pipe (not shown) is heated and shoved over the first diameter cylindrical portion 12 until the end of the section of pipe stops on the shoulder 16. This produces a larger diameter section, bell or socket, at the end of the section of pipe. The bell includes a right angle shoulder between the end of the bell and the rest of the section of pipe. As explained above, this type of socket with or without gaskets is inadequate.

In accordance with an aspect of the present invention, a bell or socket is formed on an end of a piping product, such as a length of pipe or one of numerous types of pipe fittings, while a complementary spigot is formed on an end of another piping product, such as another length of pipe or one of numerous types of pipe fittings. As should be understood, the term pipe fittings would include tees, 90° elbows, 45° elbows, any angle elbows, adapters, reducers, and the like. Also, while in the preferred embodiment and according to the method described hereinbelow in conjunction with the figures, the present invention is applicable to deformable or thermoplastic piping products, such as PVC and the like, it should be understood that the design is applicable to all types of piping products. Thus, fiberglass wound, permanent plastic, metal, to name a few, type of piping products may be designed according to the present invention and thus joined.

Figure 2:
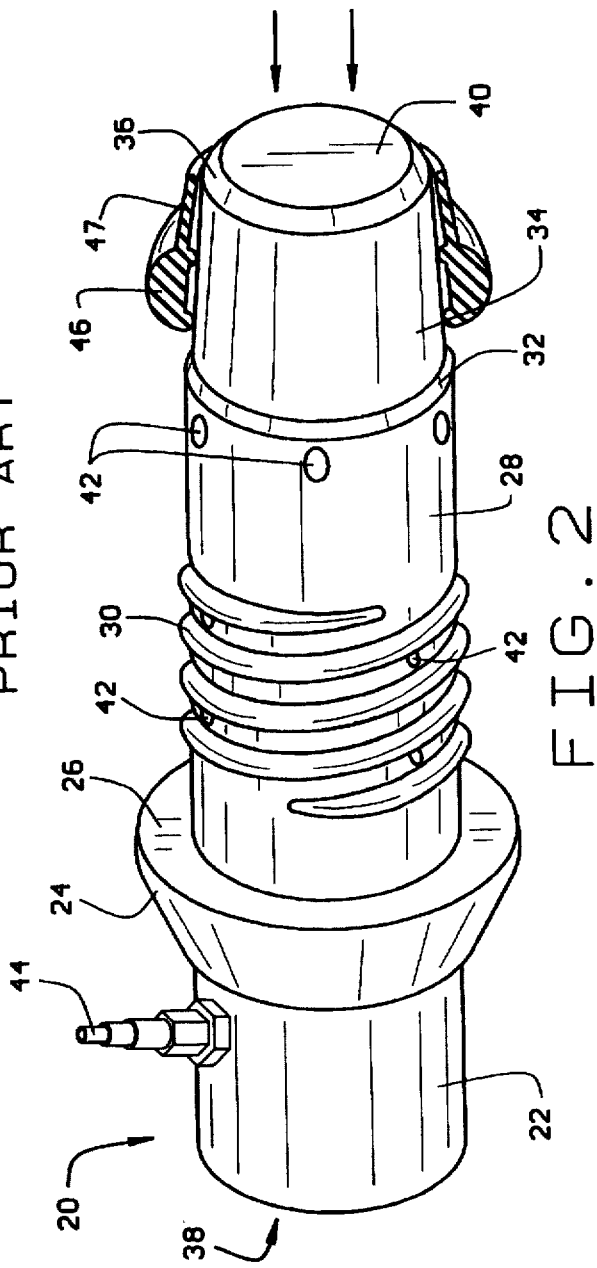
FIG. 2 is an isometric view of a vacuum pulling belling mandrel that may be used to produce an embodiment of a socket or bell in accordance with the present principles.

Referring now to FIG. 2, there is shown a belling mandrel generally designated 20 that may be used to form the aforementioned bell at the end of a section of a deformable piping product. The piping product may be a plastic pipe and is represented as such in the remainder of the figures. The belling 30 includes a first cylindrical portion 22, a frusto-conical flared portion 24 defining a shoulder 26, a second cylindrical portion 28, a tapered portion 32, and a third portion 34. The belling mandrel is hollow or has a cavity therein and closed at the ends 38, 40. The diameters of the cylindrical portions 22, 28, 34 are dependent on the desired size of the bell or socket. It should be noted that the taper 32 is actually very small, as the third cylindrical portion 34 is on the order of only approximately 0.020" less in diameter than the second cylindrical portion 28. A taper 36 is also included at the end 40 to facilitate the insertion of the belling mandrel 20 into the end of the piping product when the same is used to shape a bell in a deformable piping product. The taper 36 is commonly 15°, but may vary. The actual degree of taper will be controlled by a combination of mandrel design and gasket form. There is a need for the belling mandrel 20 to be tapered as shown to start the piping product over the mandrel and support the gasket in such a fashion as to form the proper taper in the bell end. The length and degree of the taper may therefore be varied depending on the desired length and degree of taper connecting the beginning of the bell with the piping product.

On the outside circumference of the second cylindrical portion 28 is a convex thread form 30. The thread form 30 is radiused along its width and at the beginning and end thereof. Additionally vacuum holes 42 are variously disposed along the second cylindrical portion 28, preferably as shown, within the threads 30 and proximate the taper 32. The holes 42 allow communication between the cavity within the belling mandrel 20 and the outside. A vacuum nozzle 44 is disposed in the first cylindrical portion 22 and provides communication between the outside and the cavity within the belling mandrel 20. The nozzle may be any type in order to receive a hose or the like for applying a vacuum. The purpose of the holes 42 and nozzle 44 is explained hereinbelow regarding the method of use. An annular gasket 46 (in cross-section) with a tail 47 is shown placed about the third cylindrical portion 34.

Many thread configurations, including width and/or lead design, may be utilized and are certainly contemplated with the present invention. The thread configuration/lead design may be dictated by the application of the piping product. Shear strength of the thread form is relational to the total cross-sectional area of the thread or combined threads of a multiple lead thread form. A multiple lead design can produce a greater shear strength than a single lead thread design. A thread form required to support 300' of 5" CL-200 well casing weighing 840 lbs. will be different than that required to support 300' of 12" Sch. 40 well casing weighing 2,985 lbs. Also, the thrust created by 200 psi of pressure in 5" pipe is 3,926 psi, while the thrust created by 130 psi of pressure in a 12" pipe is 14,702 psi; so the design of the interlocking mechanism is relational to the size of the pipe and its pressure rating, and the application of the piping product. For instance, in PVC water well casing applications, the piping product may be straight pipe and thus the thread configuration would be based on the shear strength needed to support the weight of the pipe. As such the thread configuration may be of a single lead design. In PVC gravity flow, non-pressurized sewer piping, requiring direction fittings, the design might require multiple leads because of less shear strength. Therefore, the thread 30 can be single or multiple lead, and any width necessary to accommodate the application. The quadruple lead design is more to accommodate the use of directional fittings. For simplicity and understanding of the present invention, the belling mandrel is as shown in FIG. 2.

The length of the socket or bell is relational to the pipe diameter, consequently the length of material available to produce the present interlocking mechanism is also relational to the pipe size. For example, a 2" socket is typically 5" in length, while a 12" socket is typically 10" in length; with 2" IPS pipe having a wall thickness from 0.091" to 0.250", and 12" IPS pipe having a wall thickness from 0.406" to 0.687". Thread design is relational to the length of material available to produce a given thread pitch in relation to the radius needed to form the thickness of the material for the pipe wall. A limitation exists in that there may sometimes be a reduction of the wall thickness when the piping material is expanded to produce the bell. However, if necessary, this may be overcome by utilizing a known wall thickening extrusion process. In this process, the pipe extrusion equipment cyclically slows, producing a thicker walled product in the area where the joint is to be formed. The finished piping product should then have a consistent wall thickness throughout its length, including the socket. It is, of course, sufficient that the wall thickness be consistent within standard tolerances. For instance, with 2" IPS pipe and a wall thickness of 0.091", the ASTM published wall thickness tolerance for pressure-rated PVC pipe is +0.020". Obviously, the tolerances for other pipe sizes are also published and should be used accordingly when appropriate.

In the use of the belling mandrel 20 for deformable or thermoplastic piping product, a piping product, such as a straight length of pipe is generally first formed. One end of the pipe is then heated to the point of deformation. A gasket 46 is placed on the belling mandrel 20, and the heated end of the pipe is placed over an onto the belling mandrel 20 until the end of the pipe reaches the shoulder 26. Once, the pipe is in place, a vacuum is pulled through the nozzle 44, the internal cavity within the belling mandrel 20 and thus the holes 42. This causes the deformable pipe to be pulled against the mandrel and thus conform to the shape of the belling mandrel. The gasket 46 is thus formed into the newly formed bell of the pipe. Once the pipe is sufficiently cool so as to be rigid, the belling mandrel 20 is removed by counter-rotation thereof. The gasket 46 thus remains seated within the bell or socket.

The end product is that shown in FIGS. 3 and 4. The piping product or, in this instance pipe, is generally designated 50, and includes a pipe portion 52 and a bell or socket 54. The pipe portion 52 is integrally connected to the bell 54 by a tapered portion 56. The configuration of the tapered portion 56 is dependent upon the configuration of the taper 36 of the belling mandrel 20, which as stated above is dependent upon design considerations. The socket 54 includes a cavity 62 into which is received via opening 64 a spigot. Integrally formed by the gasket 46 is an annular groove 58. Integrally formed by the threads 30 are threads 60.

It should be understood that a like form of the belling mandrel 20 may be used to fashion bells on piping products that are not deformable. In these instances, the holes 42 and vacuum nozzle 44 may not be necessary. It is also contemplated that a different type of mandrel may be utilized, such as a collapsible type or otherwise would be used to manufacture the bell structure. The bell structure may also be formed without the use of a mandrel by injection molding or the like.

Figure 5:
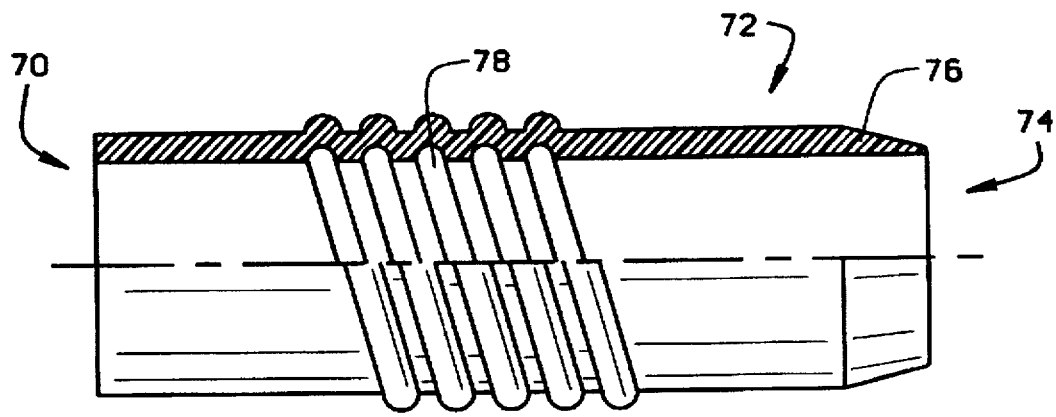
FIG. 5 is a partial cutaway view of an embodiment of a finished spigot for the socket of FIGS. 3 and 4.
Figure 6:
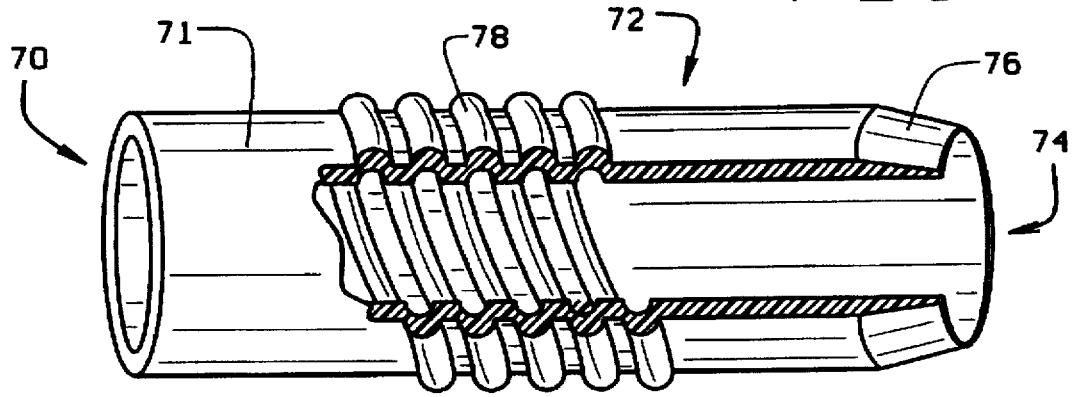
FIG. 6 is a partial cutaway view of the spigot of FIG. 5.

In order to form a pipe product joining system, a spigot must be produced. A spigot 70 is shown in FIGS. 5 and 6, and reference is now made to these two figures. The spigot 70 is formed from a piping product 72 that is shaped complementary to the bell or socket 54. The end 74 includes a taper 76 that is complementary to the taper 56 of the bell 54. The threads 78 are complementary to the threads 60 of the bell 54. The spigot 70 may be formed on a "reverse" mandrel that is clamped about a heated section of pipe, with a vacuum drawn so as to draw the spigot 70 thereon. Also, other manners of manufacture as mentioned above may be utilized.

Figure 7:
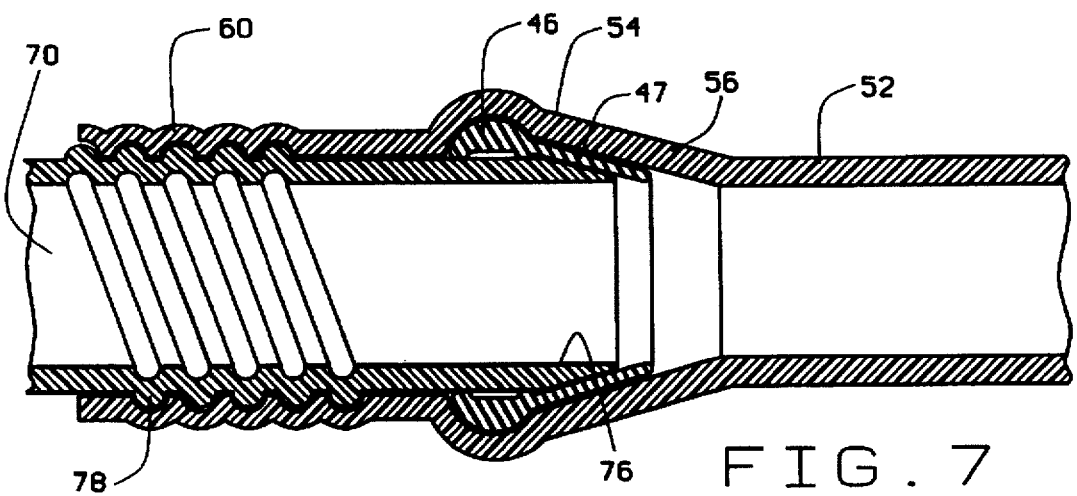
FIG. 7 is a sectional view of an assembled socket and spigot of FIGS. 3 and 5.

It should now be mentioned that the gasket 46 and its tail 47 are designed to work in conjunction with the tapers 76 and 56 to aid in making the present joining system as leak-proof of a seal as possible. This is explained in more detail hereinbelow with reference to FIG. 10. With reference now to FIG. 7, the spigot 70 is shown fully inserted into the bell 54. It can be seen that the tail 47 of the gasket 46 is interposed between the taper 76 of the spigot 70 and the taper 56 of the bell 54. The threads 60 mesh with the threads 78. In this manner, the integrally formed spigot and bell with gasket are easily joined and unjoined. No solvent welding is needed.

Figure 8:
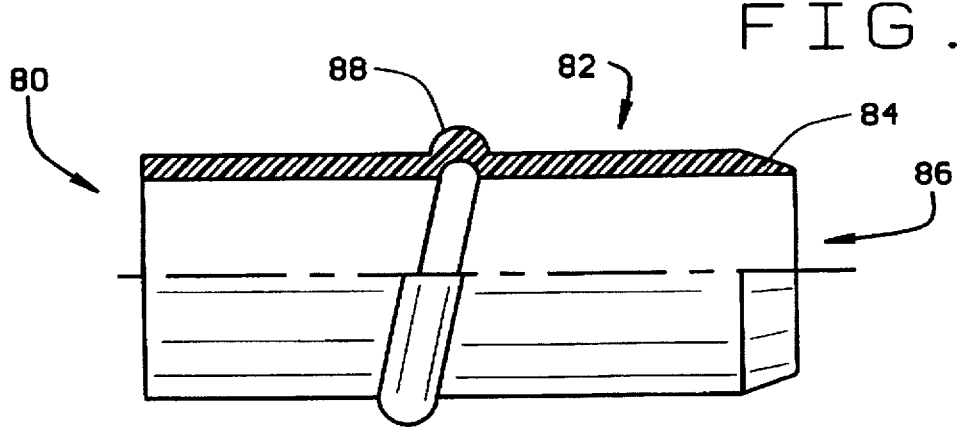
FIG. 8 is a partial cutaway view of another embodiment of a spigot in accordance with the principles of the present invention.
Figure 9:
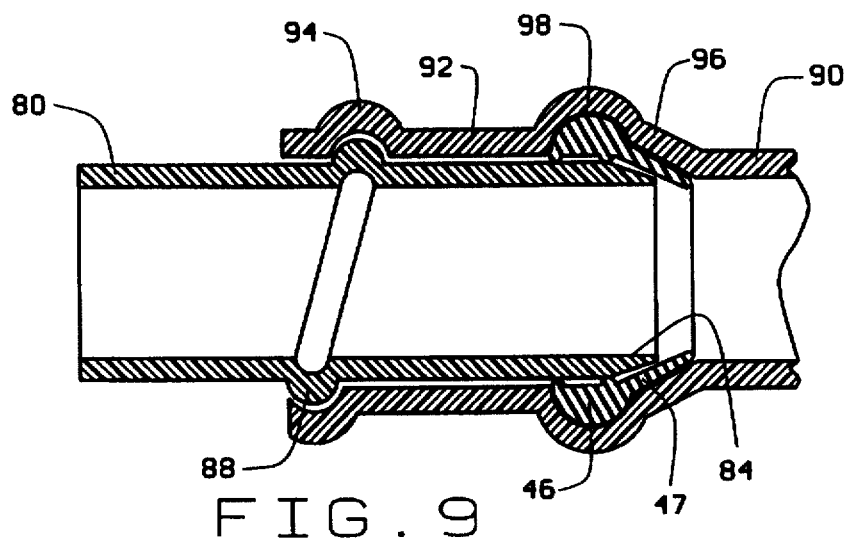
FIG. 9 is a sectional view of an alternative embodiment of an assembled socket and spigot.

An alternative embodiment of bell and spigot are depicted in FIGS. 8 and 9. The spigot 80 formed of a pipe product 82 includes a front end 86 that has a taper 84. However, this spigot has a thread 88 that provides for only one 360° rotation rather that several with the other embodiment. The bell 90 includes a taper 96 that is complementary to the taper 84. An annular groove 98 has the gasket 46 with tail 47 therein. The single thread 94 meshes with the thread 88. It should be understood from the foregoing that the two embodiments depicted in the figures are not exhaustive of the variations in thread configuration that may be utilized while still practicing the present invention. Also, the particular gasket used may be different than that shown, however, the gasket shown is preferred for the reasons hereinbelow.

Figure 10:
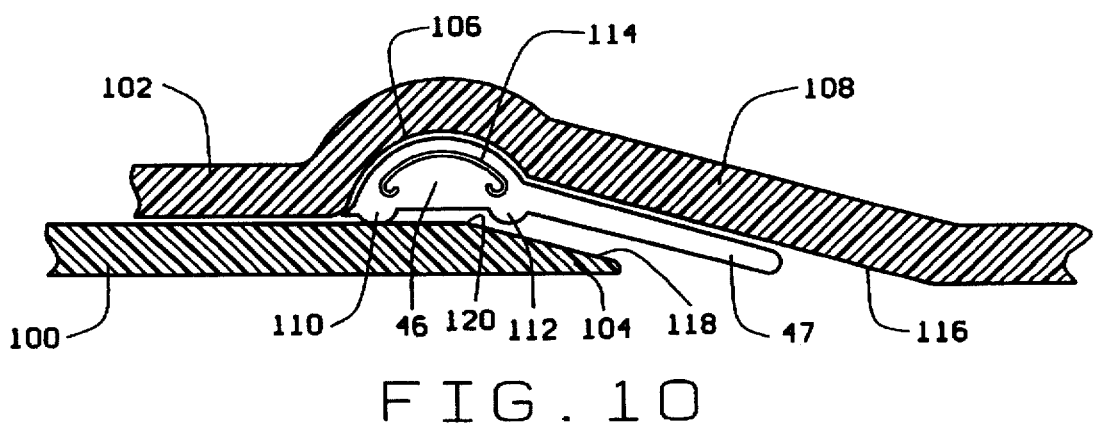
FIG. 10 is an enlarged sectional view of a portion of the assembled socket and spigot showing, in particular, the relationship of the gasket to the tapers of the respective socket and spigot.

With reference now to FIG. 10 the gasket 46 with tail 47 is shown in greater detail in relation to the end of a spigot 100 and a bell 102. First it should be noted that the spigot 100 is shown in a state wherein it is not completely inserted into the bell 102. The annular gasket 46 is defined by an essentially D-shaped (in cross-section) head, which includes a first rib 110 and a second rib 112. Optionally, a metal piece 114 may be provided in the head. The gasket 46 is disposed within the annular groove 106 adjacent the taper 108. The tail 47 extends along the inside surface 116 of the taper 108 of the bell 102, and in the fully inserted state, also extends along the outside surface 118 of the taper 104 of the spigot 100. During insertion, the beginning point 120 of the taper 104 pushes against the first rib 110 creating an upward pressure which in conjunction with the metal piece 114 creates a mechanical force against the groove 106. During further insertion the beginning point 120 of the taper 104 contacts the second rib 112 to cause pressure transference against the groove 106 eventually mechanically locking the gasket in place.

While the foregoing is directed to the preferred embodiments of the present invention, other and further embodiments of the invention may be devised without departing from the basic scope thereof, and the scope thereof is determined by the claims which follow.

What is claimed is:

1. A piping structure to allow the joining of a first extruded thermoplastic pipe product having a first consistent wall thickness throughout its length to a second extruded thermoplastic pipe product having a second consistent wall thickness throughout its length, the piping structure comprising:
    a bell formed at one end of the first extruded thermoplastic pipe product, said bell sized and configured to receive a portion of the second extruded thermoplastic pipe product;
    a first thread integrally formed with said bell such that said first thread has a thickness equal to the first consistent wall thickness;
    a first taper joining said bell with a further portion of the first thermoplastic pipe product;
    an annular groove formed on an inner surface of said bell, said annular groove positioned at a beginning slope of said taper;
    a second thread complementary to said first thread integrally formed in said second consistent wall thickness such that said second thread has a thickness equal to the second consistent wall thickness adjacent one end of the second thermoplastic pipe product;
    a second taper formed at said one end of the second thermoplastic pipe product; and
    an elastomeric gasket disposed in said annular groove.

2. The piping structure of claim 1, wherein said first and second thermoplastic pipe products are pipe fittings.

3. The piping structure of claim 1, wherein said first and second thermoplastic pipe products are tubular pipes.

4. The piping structure of claim 1, wherein said elastomeric gasket includes a main body with a substantially semi-circular cross-section, and a tail extending therefrom, said tail abutting an inner surface of said first taper and an outer surface of said second taper; whereby said tail is physically compressed by and between said first and second tapers upon joining thereof.

5. The piping structure of claim 4, wherein said gasket further includes a pressure transference rib.

6. The piping structure of claim 5, wherein said pressure transference rib is disposed on a flat side of said main body opposite said inner surface of said bell.

7. The piping structure of claim 1, wherein said first and second threads are radiused.

8. The piping structure of claim 1, wherein said bell, said first taper, and said first and second threads are formed after the first and second thermoplastic pipe products are formed.

9. The piping structure of claim 8, wherein said bell, said first taper, and said first and second threads are vacuum formed.

10. A socket and spigot structure for extruded thermoplastic piping products, the socket and spigot structure comprising:
    the socket integrally formed on one end of the extruded thermoplastic piping product and having an inside diameter substantially equal to an outside diameter of the second thermoplastic piping product, and having a continuous wall thickness equal to a wall thickness of a remainder of the extruded thermoplastic piping product;
    a tapered wall located at a bottom of said socket, connecting the socket with the remainder of the extruded thermoplastic piping product;
    the spigot integrally formed on another end of the extruded thermoplastic piping product and having a tapered end portion that opposes said tapered wall of the socket;

concave threading integrally formed on an inner surface of the socket wherein a thickness of said concave threading is equal to said continuous wall thickness;

convex threading of the same size, pitch, and linear length of said concave threading formed on an outer surface of the spigot wherein a thickness of said convex threading is equal to said continuous wall thickness, said convex threading placed such that when coupled with said concave threading, said tapered end of the spigot reaches the bottom of the socket;

an annular groove formed in the socket at a beginning of a slope of said tapered wall of the socket; and a gasket disposed within said annular groove having a portion thereof abutting an inner surface of said tapered wall and an outer surface of said tapered end, wherein a physically compressed seal is created when a spigot is threadedly coupled to a socket.

11. The socket and spigot structure of claim 10, wherein said gasket prevents intrusion of liquid into the socket.

12. The socket and spigot structure of claim 10, wherein said gasket is formed of an elastomeric and includes a pressure transference device having main body with a substantially semi-circular cross-section, and a tail extending therefrom adapted to abut the inner surface of said tapered wall and the outer surface of said tapered end.

13. The socket and spigot structure of claim 12, wherein said gasket further includes a pressure transference rib.

14. The socket and spigot structure of claim 13, wherein said pressure transference rib is disposed on a flat side of said main body opposite said inner surface of said socket.

15. The socket and spigot structure of claim 12, wherein said gasket further includes a flange extending from the inner surface of said pressure transference device and located thereupon such that when the spigot is inserted into the socket, said tapered end of the spigot applies mechanical pressure to said flange, thereby transferring pressure to the spigot there through.

16. The socket and spigot structure of claim 10, wherein said convex and concave threads are radiused.

17. The socket and spigot structure of claim 10, wherein said socket, said tapered wall, and said convex and concave threads are formed after the extruded thermoplastic pipe is formed.

18. The socket and spigot structure of claim 17, wherein said socket, said tapered wall, and said convex and concave threads are vacuum formed.

* * * * *